United States Patent [19]
Rennex

[11] Patent Number: 5,332,942
[45] Date of Patent: Jul. 26, 1994

[54] INCHWORM ACTUATOR

[76] Inventor: Brian G. Rennex, 431 Muddy Branch Rd., #101, Gaithersburg, Md. 20878

[21] Appl. No.: 72,855

[22] Filed: Jun. 7, 1993

[51] Int. Cl.[5] .............................................. H01L 41/08
[52] U.S. Cl. .................................. 310/328; 310/369
[58] Field of Search ....................... 310/328, 366, 369

[56] References Cited

U.S. PATENT DOCUMENTS

| | | | |
|---|---|---|---|
| 3,138,749 | 6/1964 | Stibitz | 310/328 |
| 3,902,084 | 8/1975 | May, Jr. | 310/328 |
| 4,570,096 | 2/1986 | Hara et al. | 310/328 |
| 4,798,989 | 1/1989 | Miyazaki et al. | 310/328 |
| 4,874,979 | 10/1989 | Rapp | 310/318 |
| 5,027,027 | 6/1991 | Orbach et al. | 310/328 X |
| 5,173,605 | 12/1992 | Hayes et al. | 310/328 X |
| 5,214,342 | 5/1993 | Yang | 310/328 |

Primary Examiner—Mark O. Budd

[57] ABSTRACT

This invention relates to inchworm linear motors or piezoelectric linear actuators and in particular to designs which address difficulties associated with miniaturization, the primary one being that the clamping driver is typically oriented laterally to the drive direction and when the lateral dimension becomes very small there is not sufficient displacement of the clamping driver to allow a practical clamping. That is, the tolerance required for the device dimensions would then be prohibitively small. This problem is overcome by orienting the clamping drivers longitudinally, i.e. parallel, to the drive direction, thereby permitting the length of said clamping drivers to be significantly greater than for the prior art case of lateral orientation. An additional feature re-directs the longitudinal clamp-drive to a lateral direction for clamping of the driven element.

27 Claims, 11 Drawing Sheets

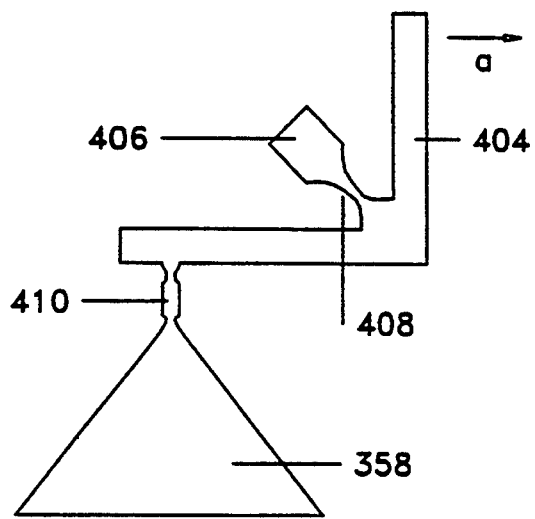
FIG.8
FIG.9A
FIG.9B
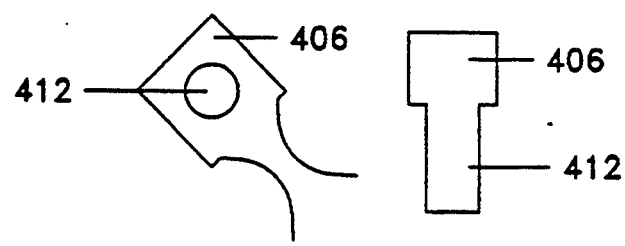
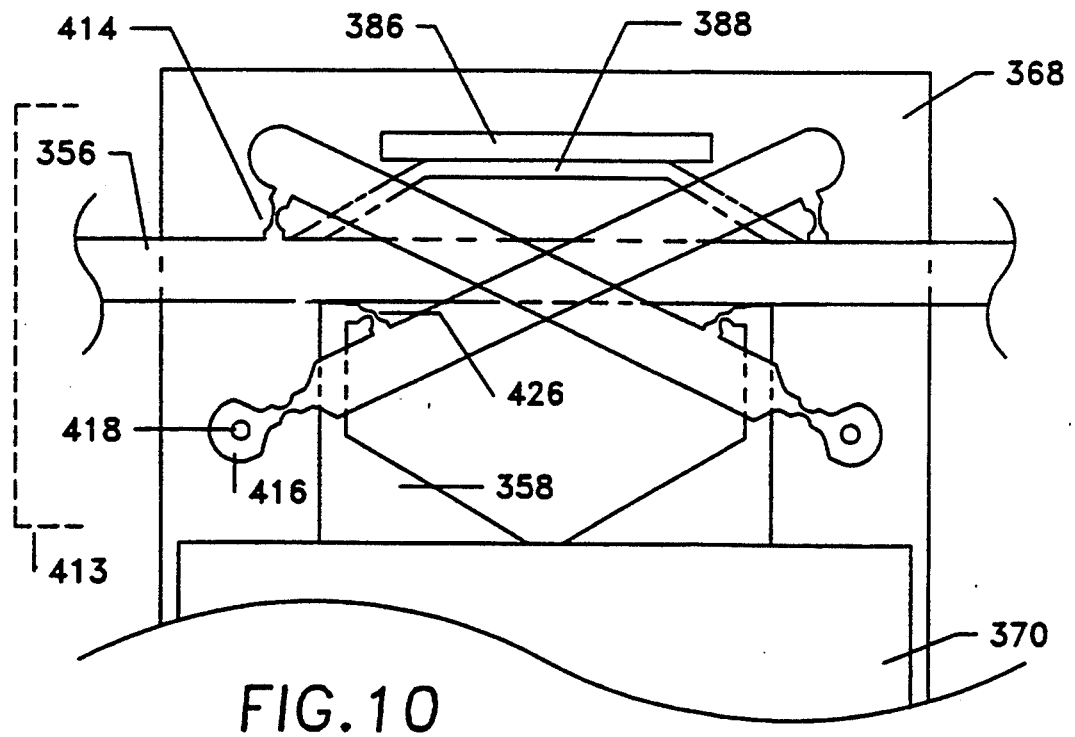
FIG.10

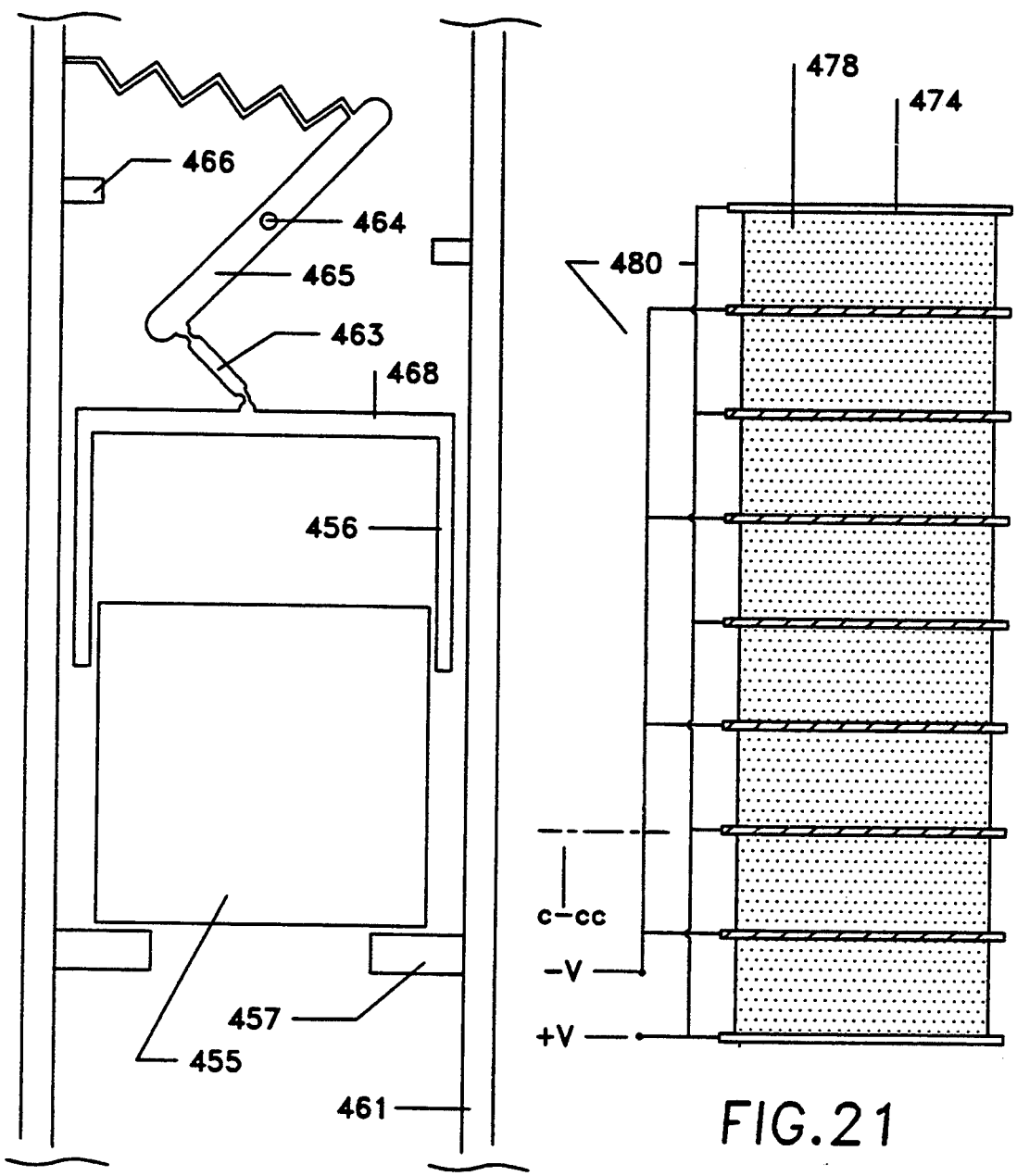
FIG.20
FIG.21
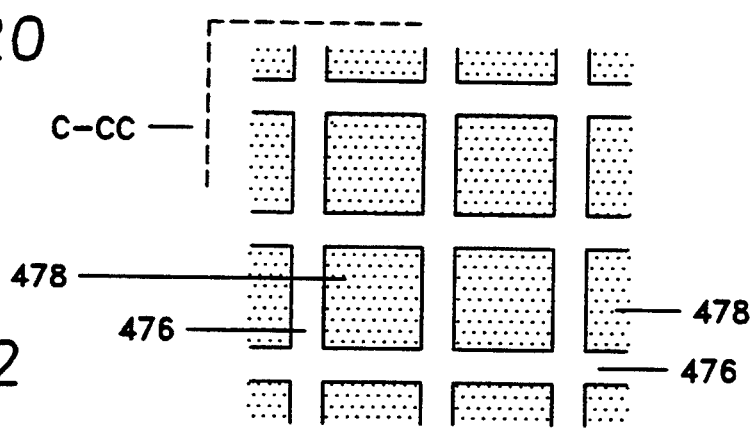
FIG.22

INCHWORM ACTUATOR

BACKGROUND OF THE INVENTION

This invention relates to inchworm linear motors or piezoelectric linear actuators and in particular to designs which address difficulties associated with miniaturization. The prior art is mature, going back to the patent of Evans, U.S. Pat. No. 3,551,764 in which piezoelectric drivers at to repeatedly clamp and alternately drive a shaft. The same function is performed by the patents of Parker—U.S. Pat. No. 3,614,486, May—U.S. Pat. No. 3,902,084, Lange—U.S. Pat. No. 4,709,183, Shibuya—U.S. Pat. No. 4,777,398, Orbach—U.S. Pat. No. 5,027,027, and Mitsuyasu—U.S. Pat. No. 5,053,668, the last being applied to a needle valve. None of this prior art addresses the essential difficulty of miniaturization which is that the clamping driver is typically oriented laterally to the drive direction; when the lateral dimension becomes very small there is not sufficient displacement of the clamping driver to allow a practical clamping. That is, the tolerance required for the device dimensions would then be prohibitively small.

SUMMARY OF THE INVENTION

It is therefore an object of the present invention to provide a piezoelectric linear actuator, referred to here as an inchworm actuator, which operates at minimal dimensions with a substantial range of displacement. This is accomplished by orienting the clamping drivers longitudinally, i.e. parallel, to the drive direction, thereby permitting the length of said clamping drivers to be significantly greater than for the prior art case of lateral orientation. An additional feature re-directs the longitudinal clamp-drive to a lateral direction for clamping of the driven element.

BRIEF DESCRIPTION OF THE DRAWINGS

FIG. 8 is a front view of detail of a monolithic hinged fulcrum for a bent lever for an inchworm actuator, according to the second embodiment of the invention.

FIG. 9 is a partial front view and a partial top view of detail of a monolithic hinged fulcrum for a bent lever for an inchworm actuator, according to the second embodiment of the invention.

FIG. 10 is a front view of a monolithic-hinged lever system for an inchworm actuator according to the third embodiment of the invention.

FIG. 20 is a side view of a butterfly application of an inchworm actuator, according to the tenth embodiment of the invention.

FIG. 21 is a side view of a monolithic stack of a driver of an inchworm actuator, according to the eleventh embodiment of the invention.

FIG. 22 is a top view of a mesh electrode of a monolithic stack of a driver of an inchworm actuator, according to the eleventh embodiment of the invention.

DESCRIPTION

The basic idea of the invention is to orient a clamping driver parallel to a driver, to achieve a sufficiently large stroke displacement for practicality in miniaturization applications. The drivers may comprise piezoelectric crystals and electrodes which produce length change in response to applied voltage, in a manner well known in the prior art. They might also be based on magnetostrictive materials.

Figure 1:
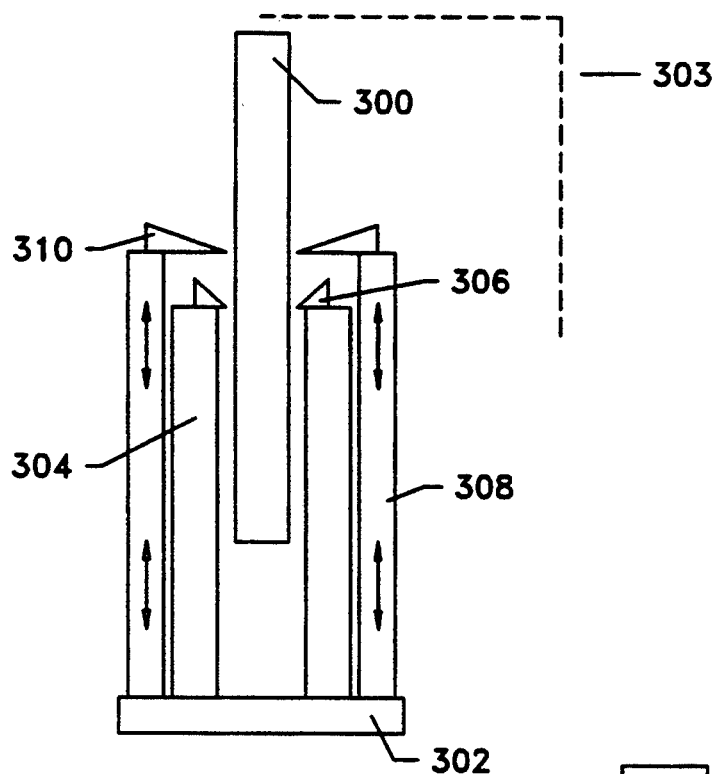
FIG. 1 is a schematic front view of a prior art inchworm actuator.

FIG. 1 is a schematic front view of prior art inchworm actuator 303. Driveshaft-a 300 is located between a pair of drivers-a 308 and a pair of fixed-clamp supports 304, and drive shaft-a 300 is rigidly attached at its bottom end to driver base-a 302. Moving clamps-a 310 clamp driveshaft-a 300 to enable driver-a 308 to drive driveshaft-a 300 according to a certain stroke-length. Fixed clamps 306-a then clamp driveshaft-a 300, while at the same time moving clamps-a 310 release driveshaft-a 300 to allow driver-a 308 to perform its return stroke without driveshaft-a 300 moving. Then, moving clamps-a 310 again clamp driveshaft-a 300, while at the same time fixed clamps-a 306 release driveshaft-a 300, and driver-a 308 drives driveshaft-a 300 by another stroke length.

By repeating this sequence, driveshaft-a 300 can driven closer to driver base-a 302 or further away from driver base-a 302, depending on the relative timing of the clamping and driving actions. Even though the stroke length of a typical piezoelectric driver is only of the order of a few tenths of a percent of the driver length, a considerable displacement can be achieved by rapid repeats of the above driving sequence. The disadvantage of prior art inchworm actuator 303 is that the lateral dimension of the clamping mechanisms such as fixed clamp-a 306 or moving clamp-a 310 is often constrained to be much smaller than its longitudinal dimension.

Figure 2:
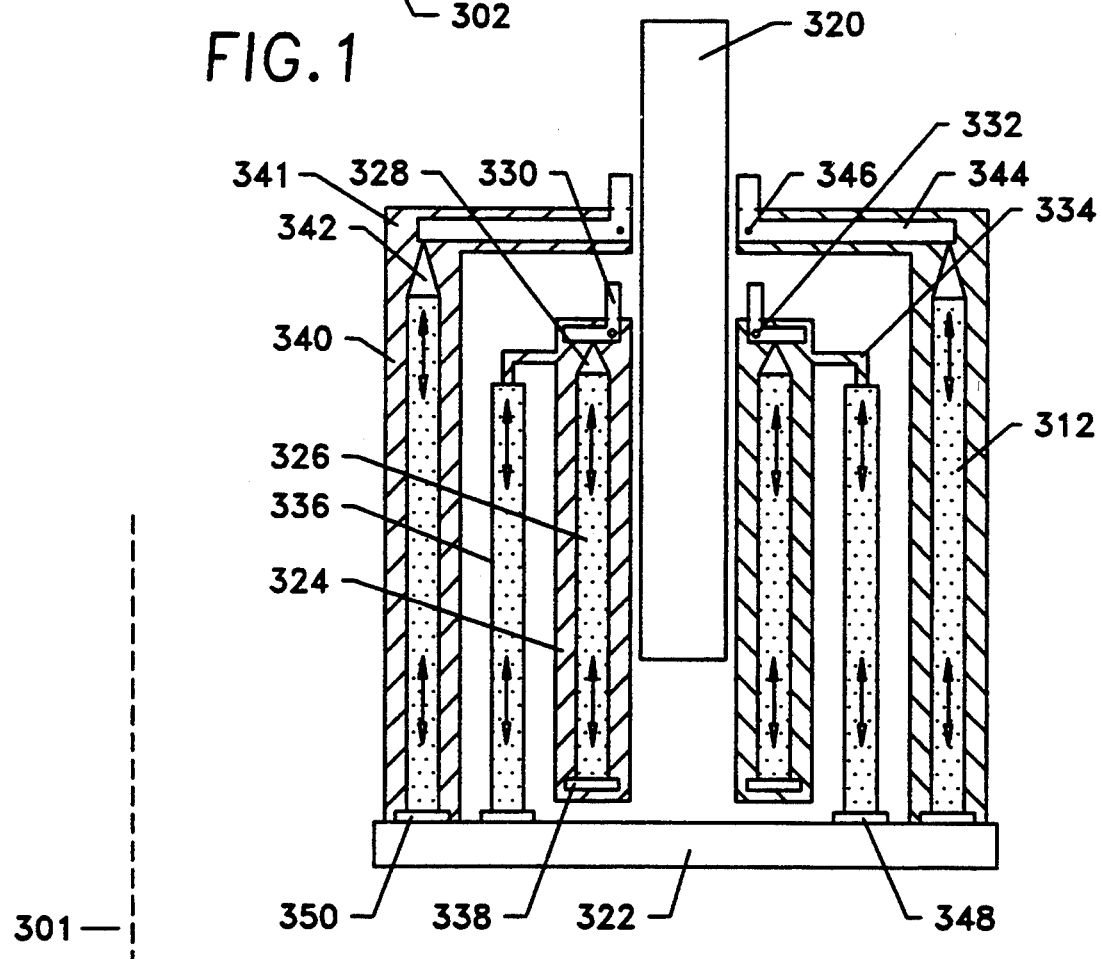
FIG. 2 is a more detailed schematic front view of an inchworm actuator, according to the first embodiment of the invention.

FIG. 2 is a more detailed schematic front view of inchworm actuator 301, according to the first embodiment of the invention. Here, the drivers for clamping are oriented longitudinally, i.e. parallel to the motion of a driveshaft, and in the example of FIG. 2, optional pairs of equivalent elements act upon driveshaft-b 320 for a symmetric drive to avoid binding. Moving clamp drivers-b 326 are oriented parallel to driveshaft-b 320. The bottoms only of moving clamp drivers-b 326 are fixedly attached, via moving clamp support attachments-b 338, to moving clamp support-b 324, and the corresponding tops move in vertical strokes to cause, via moving clamp linkage caps-b 328, moving clamp bent levers-b 330 to rotate about moving clamp pins-b 332 which is fixedly attached to the top of moving clamp supports-b 324. This causes moving clamp bent levers-b 330 to grip driveshaft-b 320 at which time moving clamp support-b 324 and driveshaft-b 320 are driven by driver-b 336, which is fixedly attached at its bottom end, via driver attachment-b 348, to driver base-b 322 and at its top end to support arm-b 334, which forms part of the top end of moving clamp support 324.

The other clamping required for intermittent actuation is the following. Fixed driver-b 312, attached at its bottom end via fixed clamp support attachment-b 350 to driver base-b 322, drives against fixed clamp bent lever-b 344 via fixed clamp linkage cap-b 342, causing it to rotate about fixed clamp pin-b 346 to clamp driveshaft-b 320. Fixed clamp pin-b 346 is fixedly attached to overarching arm 341 which forms the top of fixed clamp support-b 340 which is rigidly attached to driver base-b 322. This clamping by fixed driver-b 312 occurs at the end of the previously described clamping stroke of moving clamp driver-b 326, allowing it to make its return stoke; when the previously described clamping stroke is actually occurring, fixed driver-b 312 has released from driveshaft-b 320. By repetition of the above sequence, driveshaft-b 320 can be intermittently driven and clamped for actuator motion in both directions.

In most, but not all, electrode configurations of a piezoelectric driver it works best in expansion. For this reason it is often better to use a reversal mechanical spring for motion in what would be contraction of an actuator and correspondingly of a piezoelectric driver.

Figure 3:
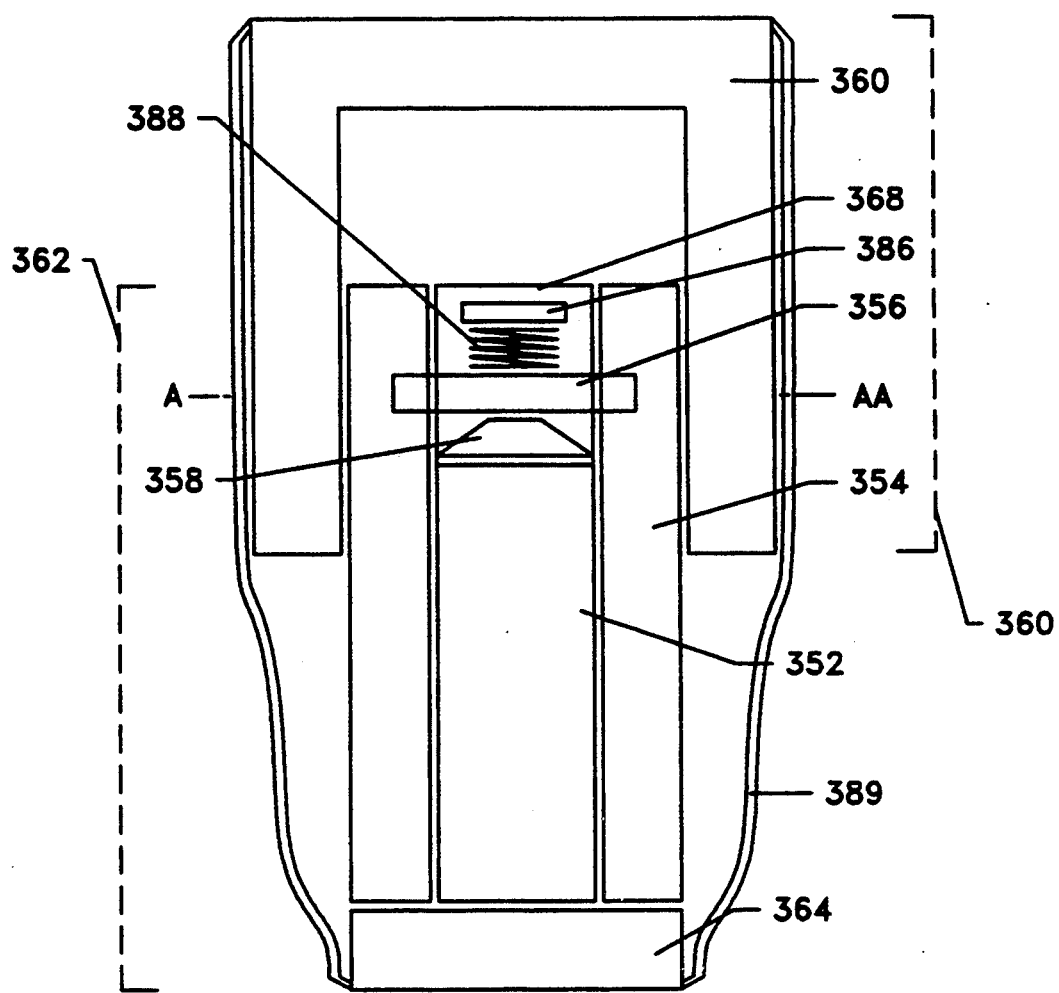
FIG. 3 is a schematic front view of an inchworm actuator, according to the second embodiment of the invention.

Two types of optional reversal springs are shown in FIG. 3, a schematic front view of inchworm actuator 301 according to the second embodiment of the invention. Later, there is a discussion of the embodiments of FIGS. 20–25 present designs for two-way piezoelectric drivers, which allow simpler actuator designs.

The basic components of inchworm actuator 301 are shown in FIG. 3. Except when otherwise indicated, these have the same names as in FIGS. 1 and 2, but the -a or -b extensions have been dropped. These include inner telescopic element 362 comprising driver assembly 352, clamping assembly 354 (for both the previously described fixed and moving clamping), driver base 364 (behind driver assembly 352), driver cap 358, driver support 368, driver bar 356 which functions equivalent to support arm-b 334 of FIG. 2 to enable driver assembly 352 to drive the moving clamp part of clamping assembly 352. Also included is outer telescopic element 360 which takes the place of driveshaft-b in FIG. 2.

The two types of reversal springs are incremental reversal spring 388, acting between reaction bar 386 and driver bar 356, and reversal spring 389 fixedly attached at one end to the top of outer telescopic element 360 and at the other end to the bottom of inner telescopic element 362. The function of the second of these, namely reversal spring 389, is more easily described. After outer telescopic element has been driven to expand, clamping assembly 354, releases it and reversal spring 389 pulls it back to contract to the desired displacement.

This last contraction is not incremental; this is contrasted with the contraction due to incremental reversal spring 388 which pushes against driver bar 356 to cause the moving clamp part of clamping assembly 354 to drive outer telescopic element 360 downward for contraction. This requires that the expansion of driver assembly 352 has been deactivated by decreasing its driving voltage. In like manner to the expansion mode, the fixed clamp part of clamping assembly 354 then clamps outer telescopic assembly 360 while the combined force due to the contraction of incremental reversal spring 388 and the expansion of driving assembly 352 causes the return stroke (which is opposite in direction to the return stroke in expansion mode) to occur, after which time, the sequence is repeated to drive outer telescopic element 360 further inward.

The advantage of using reversal spring 389 is that repeated intermittent motion is not required, so the process is simpler. The disadvantage is that the actuator force for contraction cannot be as large as is the case for the use of intermittent reversal spring 388. Requirements for the strength of these two springs are that it must be less than the expansive force of the piezoelectric driver, but large enough to prevent the laminations in a piezoelectric stack from deterioration by virtue of being pulled apart by the actuator load as the stack contracts. Since a reversal spring is always opposing the force of an expanding actuator, the net expansive force is smaller, perhaps by a factor of two, than if two opposing expansive drivers would be used. However, since the force exerted by piezoelectric stacks can be quite large, this is not a prohibitive restriction for most practical applications.

Figure 4:
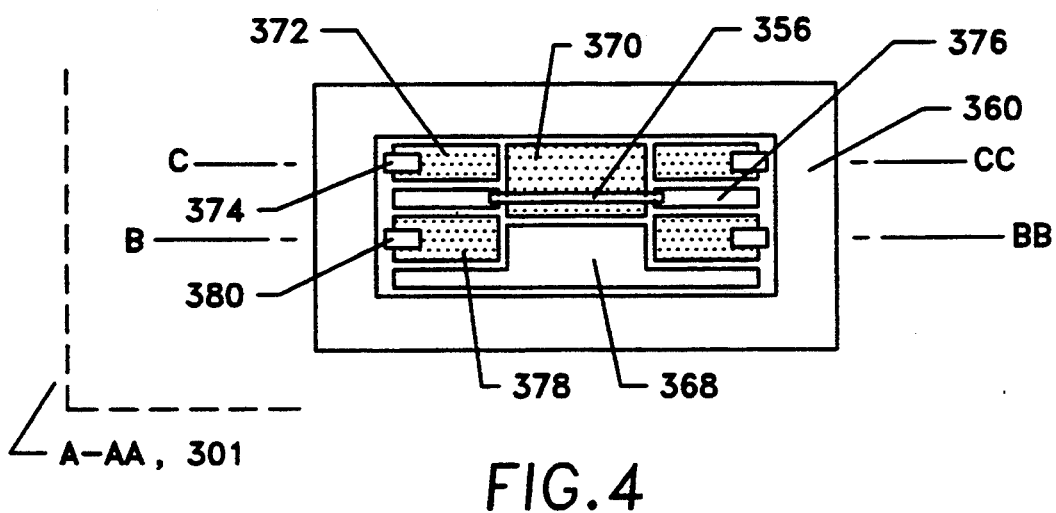
FIG. 4 is a cross-sectional top view of an inchworm actuator according to the second embodiment of the invention.
Figure 5:
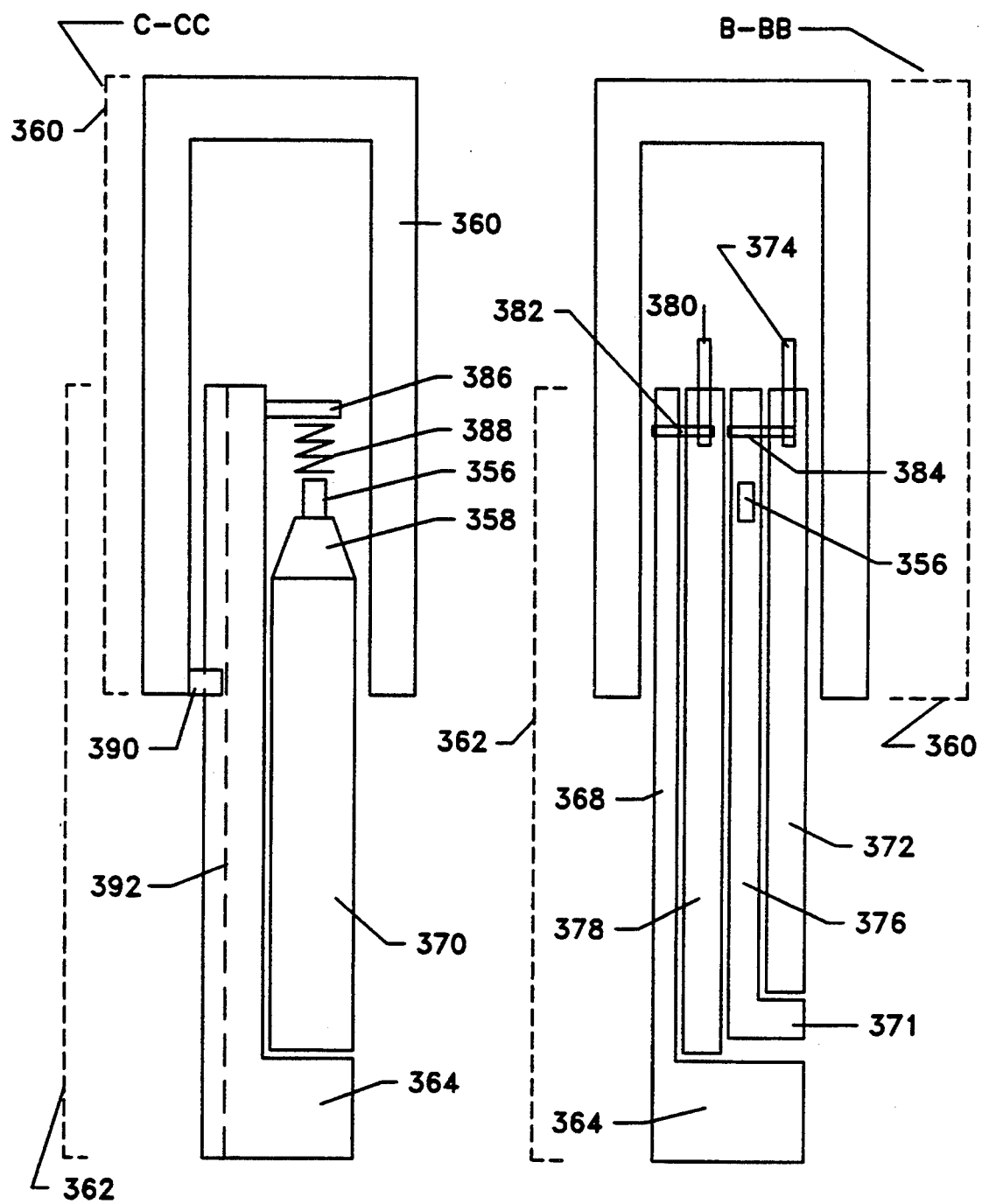
FIG. 5 is a cross-sectional side view of the driver system on the left and the clamping system on the right for an inchworm actuator, according to the second embodiment of the invention.
Figure 6:
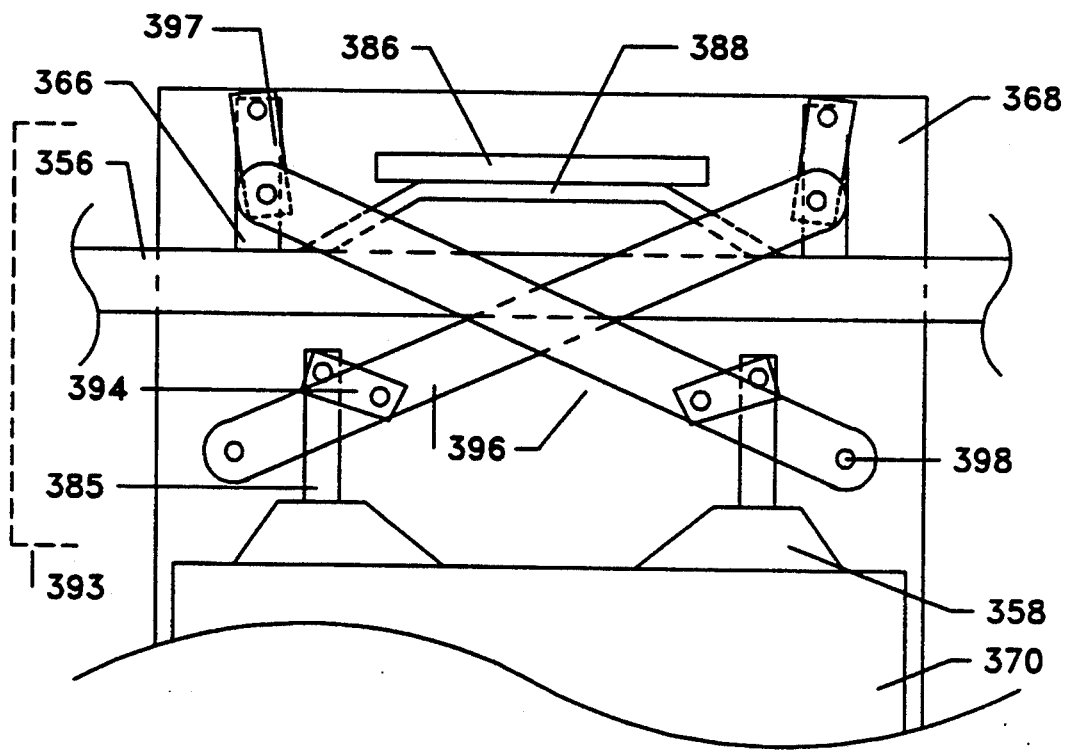
FIG. 6 is a front view of a lever system for an inchworm actuator according to the third embodiment of the invention.

FIGS. 4–6 show the second embodiment which is very similar to the first embodiment except that the elements of clamping assembly 354 are configured more optimally than in the first embodiment of FIG. 2, in which fixed clamp support 340-b is located outside of moving clamp support-b 324. This makes necessary the undesirable design features that this version of inchworm actuator 301 be unnecessarily wide and long and that over-arching arm 341 be used to reach over moving clamp support-b 324.

FIG. 4 is a cross-sectional top view of inchworm actuator 301, according to the second embodiment of the invention. FIG. 5 is a cross-sectional side view of driver assembly 352 on the left and of clamping assembly 354 on the right for inchworm actuator 301, according to the second embodiment of the invention. Moving clamp driver 372 and fixed clamp drive 378 are now located side by side in the side view rather than side by side in the front view of FIG. 2. This makes it unnecessary to use over-arching arm 341. Instead, both moving clamp driver 372, fixedly attached at its bottom to moving clamp support 376 via moving clamp support attachment 371, and fixed clamp driver 378 are in close proximity to outer telescopic element 360, allowing them to conveniently drive moving clamp bent lever 374 and fixed clamp bent lever 380, respectively, to clamp outer telescopic element 360. The various elements function in like manner to those of FIG. 2. These include fixed clamp pin 382 fixedly attached to driver support 368, moving clamp pin 384 fixedly attached to moving clamp support 376, and driver bar 356 which allows driver 370 to drive moving clamp support 376. Likewise, driver 370 acts against the bottom of driver base 364 to push driver bar 356 upward, while incremental reversal spring 388 acts against reaction bar 386 to push driver bar downward. The optional reversal spring 389 of FIG. 3 happens to not be shown in FIG. 5. Additional features are retention pin 390, fixedly attached to the bottom of outer telescopic element 360, and retention groove 392 in driver support 368, the combination of which prevents inner and outer telescopic elements 360 and 362 from becoming detached.

FIG. 6 is a front view of lever system 393 for inchworm actuator 301, according to the third embodiment of the invention. Lever system 393 serves to add a mechanical advantage to the force exerted on driver bar 356 by driver 370. That is, driver 370 has at its top end two driver caps 358, each of which act against driver extension 385 which pulls on cap link 394. Each cap link 393 acts against a mid-portion of amplifying lever 396, to which it is rotatably connected. Amplifying lever 396, is rotatably connected on one end, via fulcrum pin 398, to driver support 368, and on the other end, via driver bar extension 366 and driver bar link 397, to driver bar 356.

For reverse motion, driver bar 356 is pushed in the reverse direction by incremental reversal spring 388, which acts against reaction bar 386. Note that a pair of amplifying levers 396 is shown in FIG. 6, in which case they must be offset in the vertical direction when viewed from the front to avoid interference with each other. Alternatively, an single amplifying lever 396 could be used.

Figure 7:
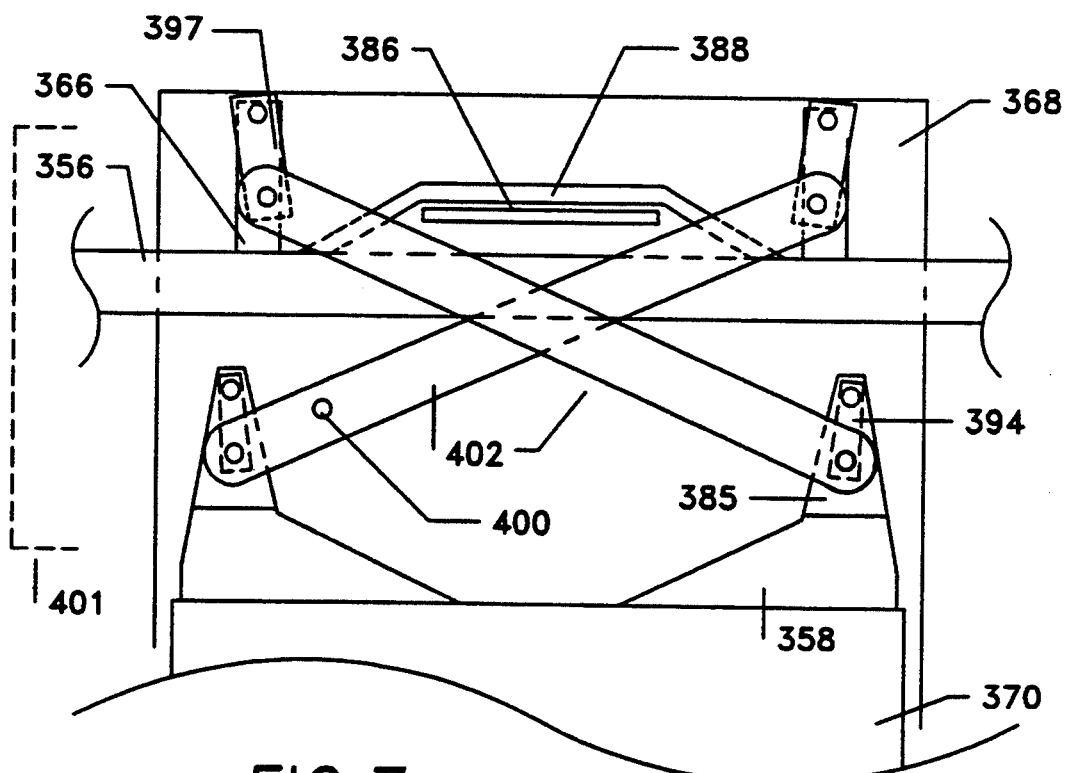
FIG. 7 is a front view of a reversing lever system for an inchworm actuator according to the third embodiment of the invention.

FIG. 7 is a front view of reversing lever system 401 for inchworm actuator 301, according to the third embodiment of the invention. Reversing lever system 401 is equivalent lever system 393 except the fulcrum of reversing amplifying lever 402 is now located in the mid portion of reversing amplifying lever 402, as evidenced by the position of reversing fulcrum pin 400. The purpose of cap link 395 and driver bar link 397 is to allow the transfer from linear motion to rotary motion.

FIG. 8 is a front view of detail of monolithic hinges which replace links for bent levers for inchworm actuator 301, according to the second embodiment of the invention. Cap hinge 410 allows bent lever 404 to undergo rotary motion as a result of the linear motion of driver cap 358; this rotary motion is indicated by arrow a. Note that cap hinge 410 is actually double-hinged. Likewise, hinge fulcrum 406 with fulcrum hinge 408 allows rotary motion of bent lever 404. FIG. 9 is a partial front view and a partial top view of detail of hinged fulcrum 406, according to the second embodiment of the invention. The bottom part of hinged fulcrum 406 is formed by hinged fulcrum post 412 which is fixedly attached, e.g., to moving clamp support 376.

FIG. 10 is a front view of hinged lever system 413 for inchworm actuator 301, according to the third embodiment of the invention. It is equivalent to FIG. 6 except that the links have been replaced by monolithic-hinged elements. That is, amplifying lever 396 is now acted upon by driver 370 via driver cap 358 and via cap hinge 426, a double hinge. In turn, amplifying lever 396 acts upon driver bar 356 via reaction bar hinge 414, which may be a double hinge, while it rotates about amplifying lever hinged fulcrum 416, which is fixedly attached to driver support 368 via amplifying lever hinge post 418.

Figure 11:
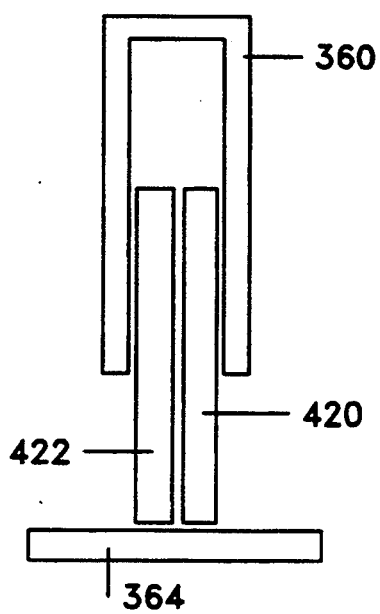
FIG. 11 shows a schematic side view of a bi-directional driver for an inchworm actuator according to the fourth embodiment of the invention.
Figure 12:
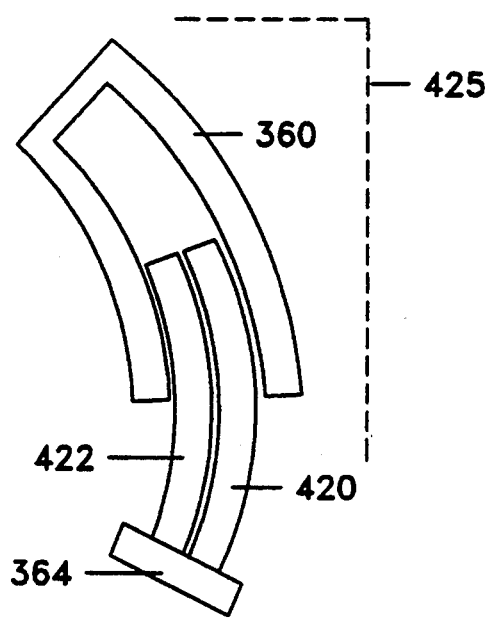
FIG. 12 shows a schematic side view of a curved-driver for an inchworm actuator, according to the fifth embodiment of the invention.

FIG. 11 shows schematic side views of a bi-directional version of inchworm actuator 301, according to the fourth embodiment of the invention. Here, outer telescopic element 360 is driven outward by expanding assembly 420, such as that of FIGS. 4 and 5, or inward by contracting assembly 422, rather than by incremental reversal spring 388 of FIG. 3. Here, the design of contracting assembly 422 is similar to that of expanding assembly 420 with the proviso that driver 370 is designed for compression. FIG. 12 is a schematic side view of curved-drive inchworm actuator 425; this is the same as the version of FIG. 11 except that the various elements that are lengthwise oriented, such as outer telescopic element 360 or expanding assembly 420, are curved rather than straight.

Figure 13:
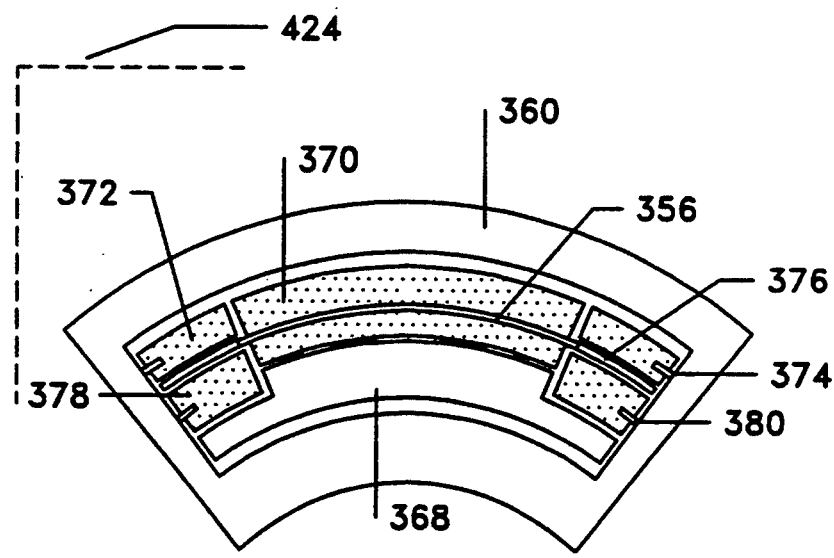
FIG. 13 is a cross-sectional top view of a curved geometry for an inchworm actuator, according to the sixth embodiment of the invention.

FIG. 13 is a cross-sectional top view of curved geometry for inchworm actuator 301, according to the sixth embodiment of the invention, which is entirely equivalent to the embodiment of FIG. 4 except that the various components form a curved geometry in cross section.

Figure 14:
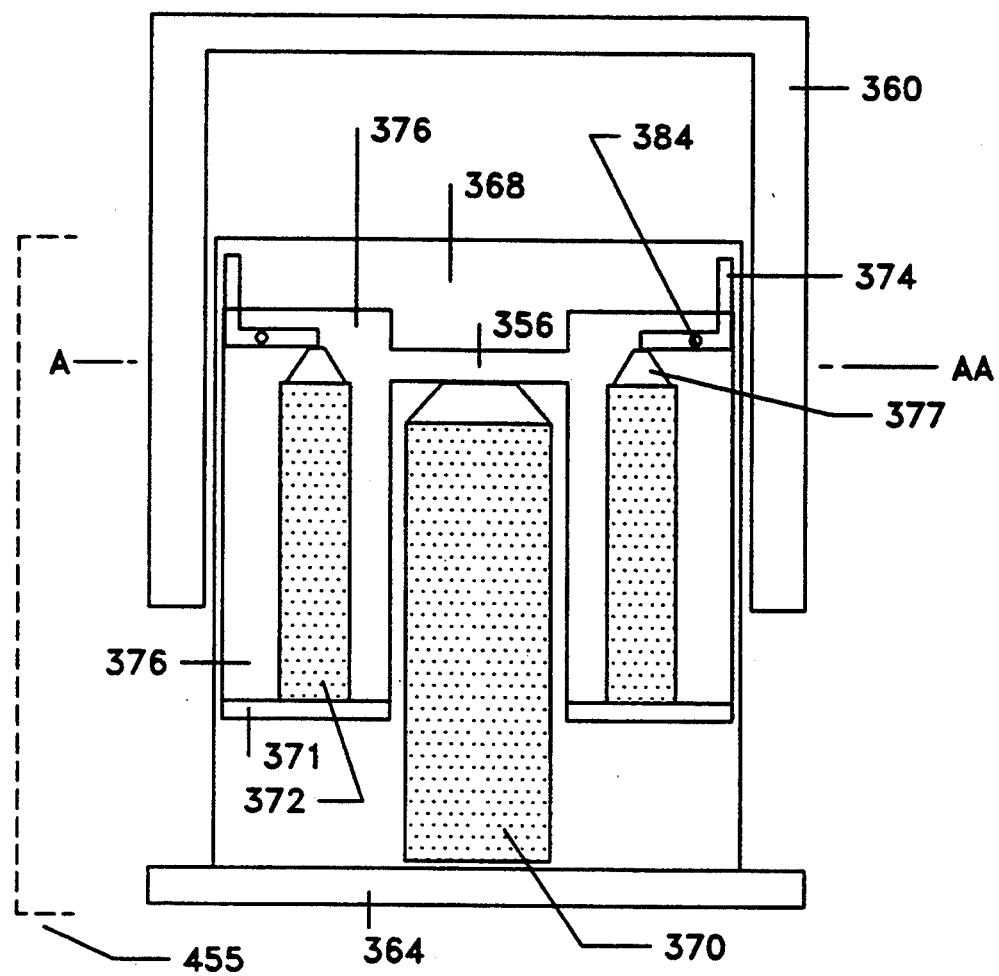
FIG. 14 is a side view of a continuous drive variation for an inchworm actuator, according to the seventh embodiment of the invention.
Figure 15:
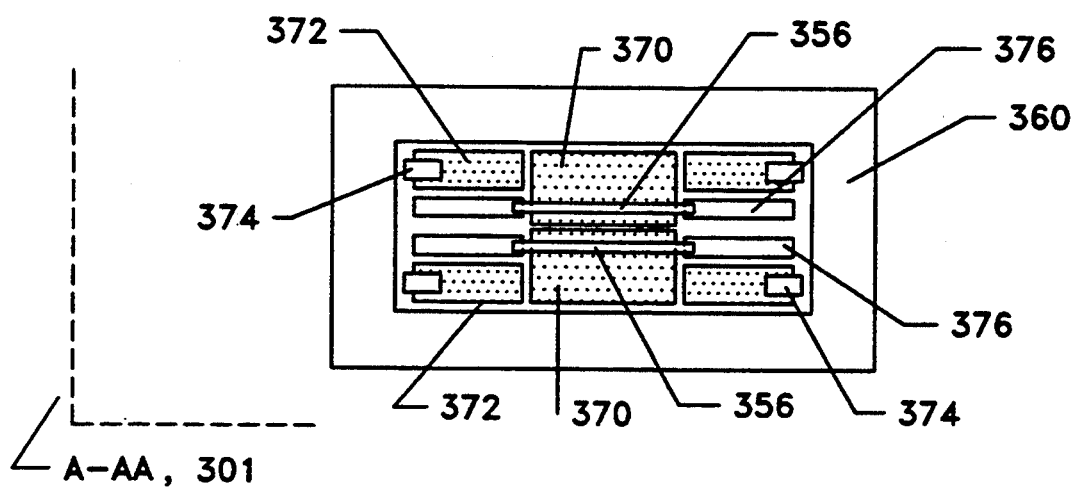
FIG. 15 is a top view of a continuous drive variation for an inchworm actuator, according to the seventh embodiment of the invention.

FIG. 14 is a side view and FIG. 15 a top view of continuous drive inchworm actuator 427, according to the seventh embodiment of the invention. This is similar to the embodiment of FIGS. 4 and 5 except that the components called or related to a fixed clamp, such as fixed clamp driver 378, are replaced by a second moving clamp component such as moving clamp driver 372. That is, there are now two moving clamp drivers 372; also, there are two drivers 370. The idea behind this embodiment is that a first driver 370 drives a first moving clamp support 376, which is in its clamped position by virtue of a first moving clamp bent lever 374 having been driven to impinge against outer telescopic element 360 by a first moving clamp driver 372, while at the same time a second driver 370 reverse-drives a second moving clamp support 376, which is in its unclamped position by virtue of a second moving clamp bent lever 374 having been reverse driven to release from outer telescopic element 360 by a second moving clamp driver 372. In the second part of the drive cycle, the roles of the two equivalent moving clamp driving systems are reversed. This means that outer telescopic clamp 360 is continuously driven, because one moving clamp drive system is driving it while the other is undergoing its return stroke. Although this embodiment has a few more parts, the actuation will be faster and smoother resulting in a more effective and durable device.

Figure 16:
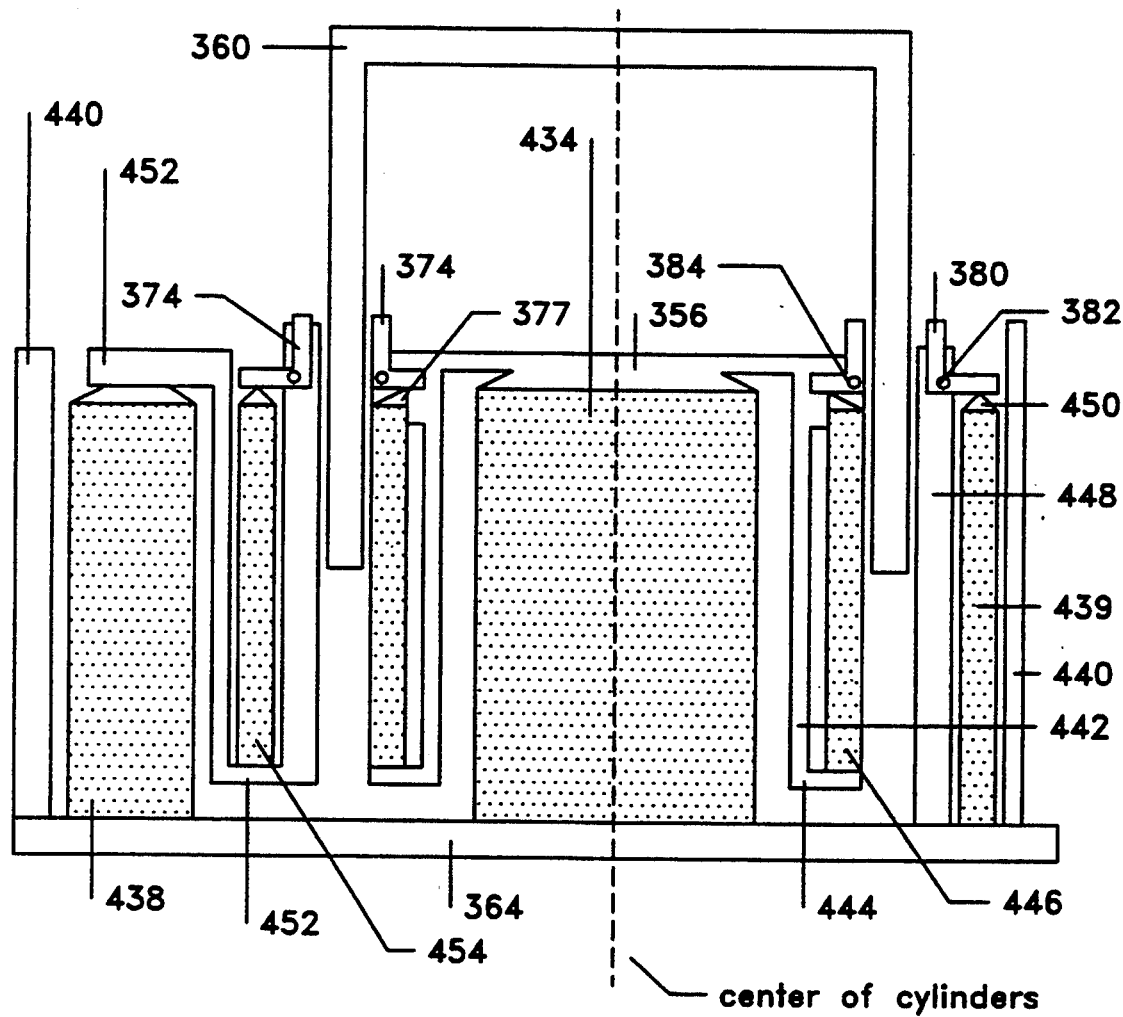
FIG. 16 is a side cross-sectional view of a continuous-drive variation on the left side and an intermittent-drive variation on the right side for a cylindrical geometry for an inchworm actuator, according to the eighth embodiment of the invention.

FIG. 16 is a side cross-sectional view of a continuous-drive variation on the left side and an intermittent-drive variation on the right side for cylindrical geometry for inchworm actuator 301, according to the eighth embodiment of the invention. It should be understood that for the continuous-drive variation the right side would be the mirror image of the left side (about the indicated centerline of the cylinders) and vice versa for the intermittent-drive variation on the right. This means that the left side is analogous to the embodiment of FIGS. 14 and 15, while the right side is analogous to the embodiment of FIGS. 4 and 5. Also, the components inside of outer telescoping element 360 are mirror images about the center line of the cylinders.

Looking at the left side of FIG. 16, each of the driver or support assemblies or the telescopic elements is now cylindrical. For example, outer telescopic element 360 is now a hollow cylinder. For continuous driving, the following sequence is enacted. Inner driver 434 drives inner moving clamp support 442, which is in its clamped position by virtue of a first moving clamp bent lever 374 having been driven to impinge against outer telescopic element 360 by inner moving clamp driver 446, attached at its bottom to the bottom of inner moving clamp support 442 by inner moving support bar 444, while at the same time outer driver 438 reverse-drives outer moving clamp support 452, which is in its unclamped position by virtue of moving clamp bent lever 374 having been reverse driven to release from outer telescopic element 360 by outer moving clamp driver 454 which is rigidly attached at its bottom to the bottom of outer moving clamp support 452. An additional feature is outer tube 440 which serves as protection for outer driver 438.

In the second part of the drive cycle, the roles of the two equivalent moving clamp driving systems, one associated with inner driver 434 and the other associated with outer driver 438, are reversed. This means that outer telescopic clamp 360 is continuously driven, because one moving clamp drive system is driving it while the other is undergoing its return stroke.

Looking at the right side of FIG. 16, for intermittent driving, the following sequence is enacted. Inner driver 434 drives inner moving clamp support 442, which is in its clamped position by virtue of a first moving clamp bent lever 374 having been driven to impinge against outer telescopic element 360 by inner moving clamp driver 446, attached at its bottom to the bottom of inner moving clamp support 442 by inner moving clamp support bar 444, while at the same time outer fixed clamp driver 439 undergoes its return stroke, thereby releasing outer telescopic element 360. This is due to the fact that fixed clamp bent lever 380 is reverse-driven to its unclamped position by outer fixed clamp driver 439, which is rigidly attached at its bottom to the bottom of fixed clamp support 448. An additional feature is outer tube 440 which serves as protection for outer driver 438. In like manner to the sequence for the embodiment of FIGS. 4 and 5, when inner driver 434 undergoes its return stroke, outer fixed clamp driver 439 acts to clamp outer telescopic element 360.

In this manner, outer telescopic clamp 360 is intermittently driven, because the fixed clamp drive system is holding it in a fixed position while inner driver 434 is undergoing its return stroke.

Figure 17:
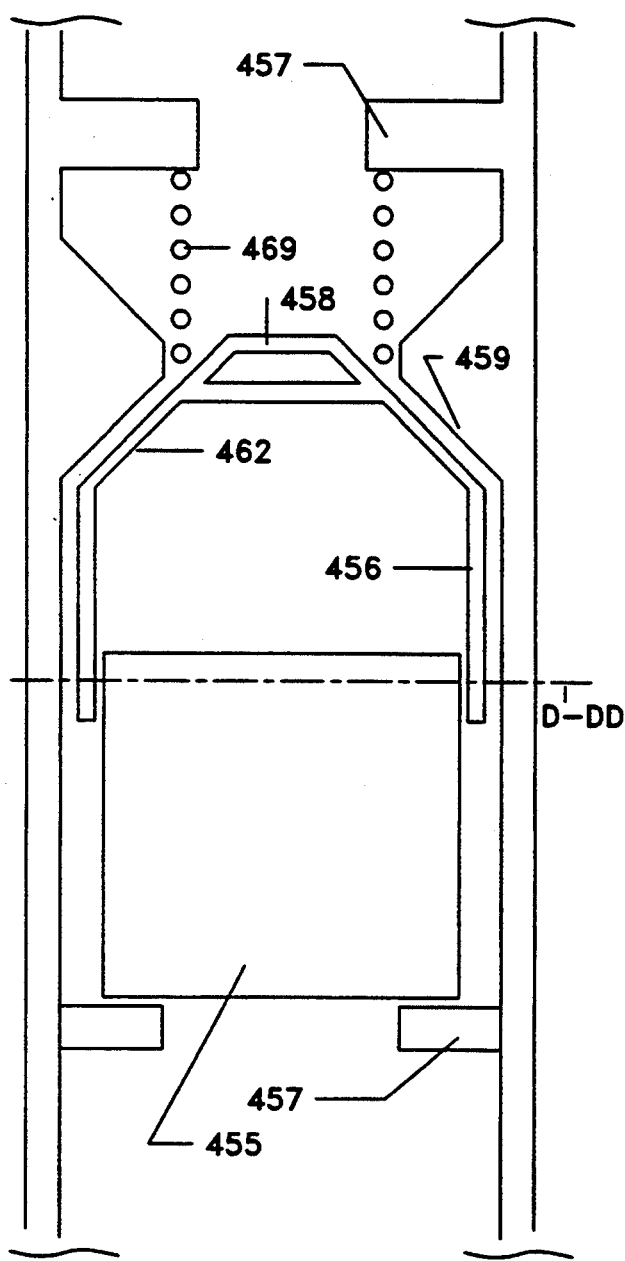
FIG. 17 is a side view of a needle-valve application of an inchworm actuator, according to the ninth embodiment of the invention.

FIG. 17 is a side view of a needle-valve application of inchworm actuator 301, according to the ninth embodiment of the invention. Driver section 455 corresponds to driver assemblies of the earlier embodiments, and driven section 456, which comprises nozzle 451, corresponds to outer telescopic element 360. These are housed in tube 461 through which fluid or gas flows. Driver section 455 pushes against support tabs 457 to incrementally or continuously drive driven section 455 until nozzle head 458 seats into nozzle seat 459 to block said fluid flow. Note that nozzle 451 can be maintained at any position between completely open or completely closed for continuous flow control. Optional nozzle spring 469 pushes nozzle 451 back open when driver section 455 releases it.

Figure 18:
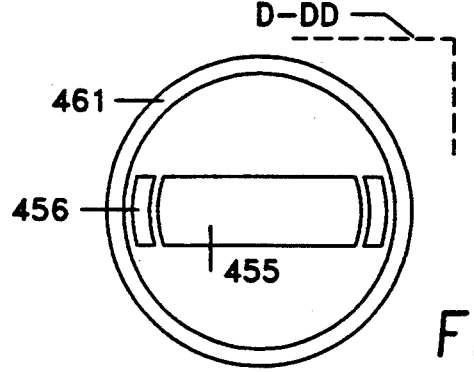
FIG. 18 is a simplified cross-sectional top view of a needle-valve application of an inchworm actuator, according to the ninth embodiment of the invention.
Figure 19:
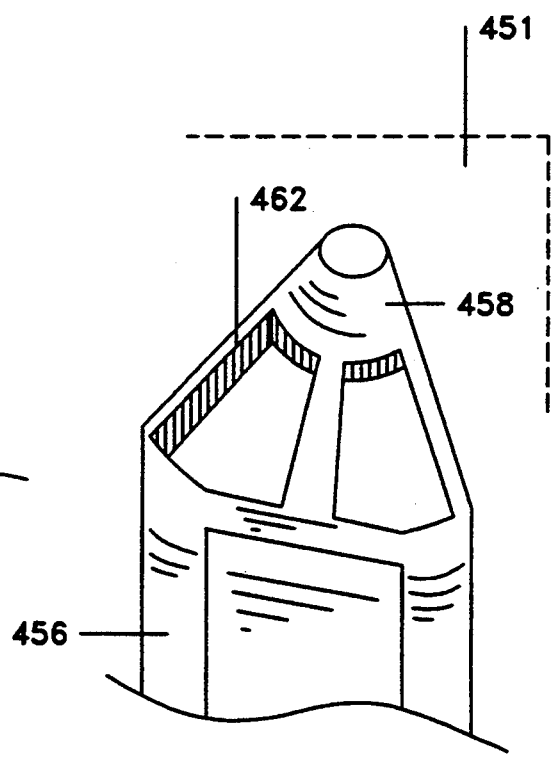
FIG. 19 is a perspective view of the nozzle of a needle-valve application of an inchworm actuator, according to the ninth embodiment of the invention.

FIG. 18 is a simplified cross-sectional top view of two variations on the same needle-valve application of inchworm actuator 301, and FIG. 19 is a perspective view of the nozzle of a needle-valve application of inchworm actuator 301, according to the ninth embodiment of the invention. Note that driver section 455 and driven section 456 do not fill the entire area inside tube 461, thereby allowing fluid flow.

FIG. 19 shows how nozzle brace elements 462, which connect driven section 456 to nozzle head 458, to permit fluid flow from inside driven section 456 for the case when it may be hollow.

FIG. 20 is a side view of a butterfly valve application of inchworm actuator 301, according to the tenth embodiment of the invention. It is similar to the previous embodiment except that the valve type is now a butterfly valve. Butterfly flap element 465 is a circular disc which completely blocks tube 461 when driver section 455 pushes driven section 456 upward, via butterfly driver link 463 which is attached to driver cross-piece 468. Flap stops 466 prevent butterfly flap element 465 from moving past the position of complete closing. Butterfly flap element 465 rotates about butterfly axle 464, and it is returned to an open position by flap spring 467.

Drivers such as driver 370, moving clamp driver 372, or fixed clamp driver 378 of FIG. 4 are rods of piezoelectric material which change length under an electric field. The traditional driver would be a stack of piezoelectric rod sections bonded to electrode sheets between each adjacent piezoelectric section. The disadvantage of this design is that tensile or non-axial loads on the driver cause the bonded laminations in this stack to tear apart. While this traditional design could be used for these drivers, the following designs are presented as improvements which allow tensile and non-axial loads and which can be operated at reduced voltages.

FIG. 21 is a side view of monolithic stack 472 of a driver of an inchworm actuator 301, and FIG. 22 is a top view of mesh electrode 476 of monolithic stack 472 of a driver of an inchworm actuator 301, according to the eleventh embodiment of the invention. The purpose of this design is to have a driver, which in this case is a rod of piezoelectric material, which has closely-spaced (in the longitudinal direction) electrodes, which can be used with compressive loads, tensile loads, and non-axial loads, and which is easy to make. Furthermore, close spacing of these electrodes allows a smaller operating voltage. Mesh electrodes are maintained in a closely-spaced configuration when monolithic stack 472 is manufactured, which means that the piezoelectric material of piezoelectric sections 478 permeates the voids of mesh electrodes 476. This makes monolithic stack 472 as resistant to tensile or non-axial loads as a solid rod of piezoelectric material. The requirement for manufacture is that the mesh material must withstand the sintering temperature of 1200° C.; e.g. nichrome would work.

The purpose of each pair of mesh electrodes 476 is to impart an intervening electric field which is uniform between mesh electrodes 476. This ensures that each piezoelectric section 478 will change dimensions a maximum amount when voltages $\pm V$ are applied to mesh electrodes 476 via electrode wires 480. End electrodes 474 can be used at either end of monolithic stack 472. It should be understood that the cross-sectional shape of monolithic stack 472 may assume many variations such as circular, elliptical, or rectangular.

Figure 23:
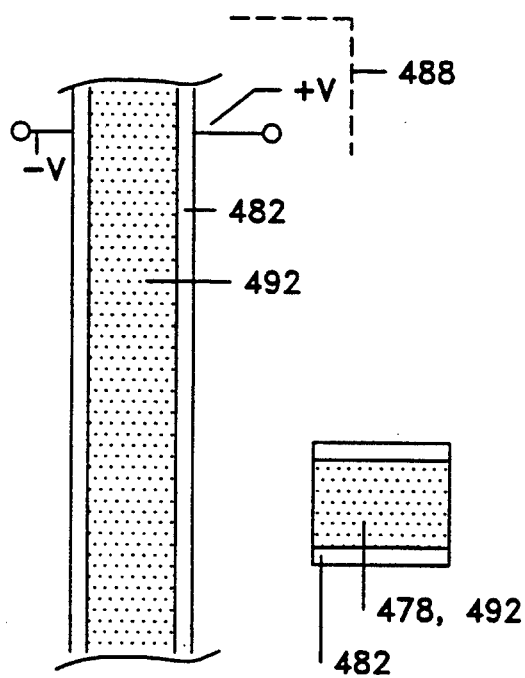
FIG. 23 is a side view of a transverse-poled driver of an inchworm actuator, according to the eleventh embodiment of the invention.

FIG. 23 is a side view (a) and two top views (b and c) of a transverse-poled driver 488 of an inchworm actuator 301, according to the eleventh embodiment of the invention. Longitudinal electrodes 482 on either side of longitudinal piezoelectric body 492 cause an electric field transverse to the longitudinal direction, which causes longitudinal piezoelectric body 492 to lengthen in the longitudinal direction. The top view of FIG. 23 indicates that the cross-sectional shapes of transverse-poled driver 488 might be rectangular.

Figure 24:
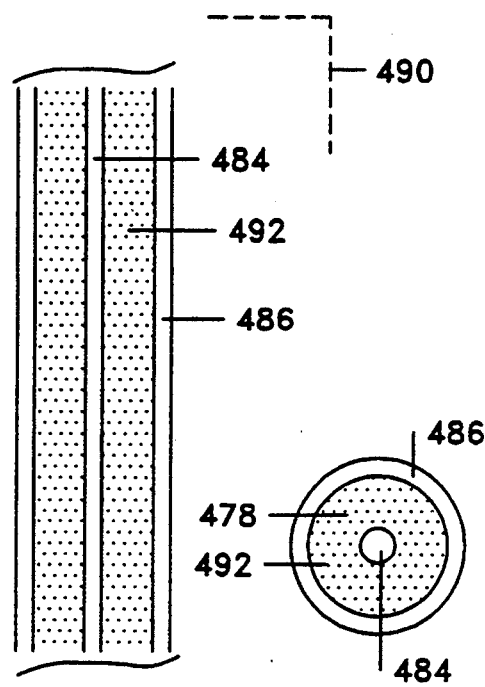
FIG. 24 is a top view of a cylindrical transverse-poled driver of an inchworm actuator, according to the eleventh embodiment of the invention.

FIG. 24 is a side view and a top view of cylindrical transverse-poled driver 490 of inchworm actuator 301, according to the eleventh embodiment of the invention. It is similar to the previous variation except that the electric field is between center electrode 484 and perimeter electrode 486. The top view of FIG. 24 indicates that the cross-sectional shape of transverse-poled driver 488 could be circular; it also might be elliptical.

Figure 25:
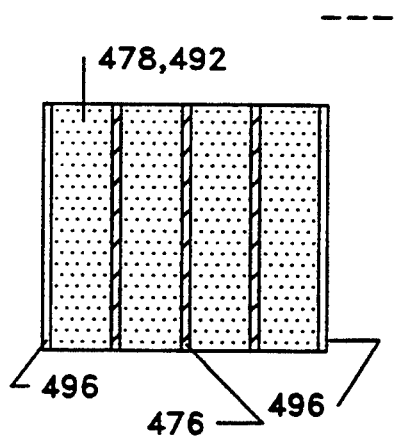
FIG. 25 is a top view of mesh electrodes within a transverse-poled driver of an inchworm actuator, according to the eleventh embodiment of the invention.
Figure 26:
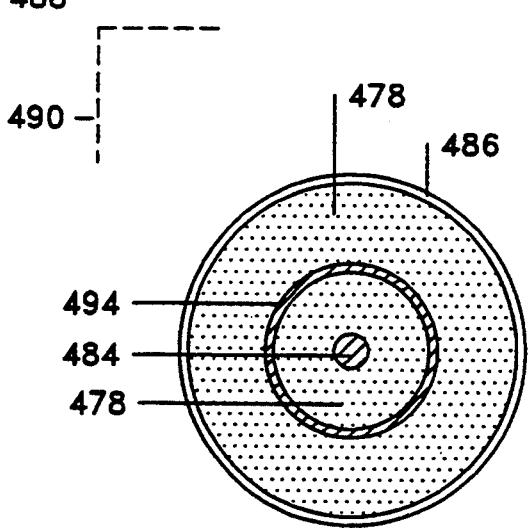
FIG. 26 is a top view of inner cylindrical mesh electrodes of a cylindrical transverse-poled driver of an inchworm actuator, according to the eleventh embodiment of the invention.

FIG. 25 is a top view of mesh electrodes 476 within transverse-poled driver 488 of inchworm actuator 301, according to the eleventh embodiment of the invention. FIG. 26 is a top view of inner cylindrical mesh electrodes 494 of cylindrical transverse-poled driver 490 of inchworm actuator 301, according to the eleventh embodiment of the invention.

Having thus described the invention, what is claimed as new and desired to be secured by Letters Patent is:

1. An inchworm actuator comprising:
   a driven element,
   a driver base,
   a driver assembly comprising a driver actuator, wherein said driver actuator has a length that is greater than its width or depth, wherein said driver actuator is oriented so that said driver actuator length is parallel to the direction in which said driven element is driven, wherein a bottom end of said driver actuator is fixedly attached to said driver base,
   a moving clamp assembly comprising a moving clamp actuator, a moving clamp, and a moving clamp support fixedly attached at its top end to the top of said driver actuator, wherein said moving clamp actuator has a length that is greater than its width or depth, wherein said moving clamp actuator is oriented so that said moving clamp actuator length is parallel to the direction in which said driven element is driven, wherein the bottom of said moving clamp actuator is fixedly attached to the bottom of said moving clamp support, wherein said moving clamp is attached to the top of said moving clamp support, wherein said moving clamp actuator drives said moving clamp to clamp said driven element,
   a second clamp assembly, the bottom of which is fixedly attached to said driver base, wherein said second clamp assembly has a length that is greater than its widths or depths, wherein said second clamp assembly is oriented so that said length is parallel to the direction in which said driven element is driven, wherein said second clamp assembly may be activated to clamp said driven element, and
   a wiring system for activation of said driver actuator, said moving clamp actuator, and said second clamp assembly for driving said inchworm actuator to expand or contract, wherein said expansion occurs when the following actuator stroke cycle is enacted: in a first period of time said second clamp assembly releases said driven element and said moving clamp assembly engages said driven element, at which time said driver actuator changes length to drive said moving clamp assembly and said driven element in an expanding direction; and in a second period said moving clamp assembly releases said driven element at which time said second clamp assembly engages said driven element, after which time said driver actuator undergoes its return stroke in the direction of contraction, wherein said contraction occurs when the following actuator stroke cycle is enacted: in a first period of time said second clamp assembly releases said driven element and said moving clamp assembly engages said driven element, at which time said driver actuator changes length to drive said moving clamp assembly and said driven element in a contracting direction; and in a second period said moving clamp assembly releases said driven element at which time said second clamp assembly engages said driven element, after which time said driver actuator undergoes its return stroke in the direction of expansion.

2. The inchworm actuator of claim 1, wherein said second clamp assembly comprises:
   a fixed clamp assembly comprising a fixed clamp support, the bottom of which is attached to said driver base, and a fixed clamp, which is driven to clamp said driven element by a fixed actuator, wherein said fixed actuator has a length that is greater than its width or depth, wherein said fixed actuator is oriented so that said fixed actuator length is parallel to the direction in which said driven element is driven, wherein a bottom end of said fixed actuator is fixedly attached to said driver base.

3. The inchworm actuator of claim 1, wherein said second clamp assembly comprises:
   a second driver assembly comprising an second driver actuator, wherein said second driver actuator has a length that is greater than its width or depth, wherein said second driver actuator is oriented so that said second driver actuator length is parallel to the direction in which said driven element is driven, wherein a bottom end of said second driver actuator is fixedly attached to said driver base, and
   a second moving clamp assembly comprising a second moving clamp actuator, a second moving clamp, and a second moving clamp support fixedly attached at its top end to the top of said driver actuator, wherein said second moving clamp actuator has a length that is greater than its width or depth, wherein said second moving clamp actuator is oriented so that said second moving clamp actuator length is parallel to the direction in which said driven element is driven, wherein the bottom of said second moving clamp actuator is fixedly attached to the bottom of said second moving clamp support, wherein said second moving clamp is attached to the top of said second moving clamp support, wherein said second moving clamp actuator drives said second moving clamp to clamp said driven element, wherein said wiring system provides particular control sequences of activation of said driver actuator, said moving clamp actuator, said second driver actuator, and said second moving clamp actuator which result in the continuous expansion or contraction of said inchworm actuator, wherein said continuous expansion occurs when the following actuator stroke cycle is enacted: in a first period of time said second moving clamp assembly releases said driven element and said moving clamp assembly engages said driven element, at which time said driver actuator changes length to drive said moving clamp assembly and said driven element in direction of expansion; and in a second period of time said moving clamp assembly releases said driven element at which time said second moving clamp assembly engages said driven element, after which time said driver actuator undergoes its return stroke in the direction of contraction while at the same time said second moving clamp actuator drives said second moving clamp to clamp said driven element at which time said second driver actuator drives said second moving clamp assembly and said driven element in the direction of expansion, wherein said continuous contraction occurs when the following actuator stroke cycle is enacted: in a first period of time said moving clamp assembly releases said driven element and said second moving clamp assembly engages said driven element, at which time said second driver actuator changes length to drive said second moving clamp assembly and said driven element in direction of contraction, and in a second period of time said second moving clamp assembly releases said driven element at which time said moving clamp assembly engages said driven element, after which time said second driver actuator undergoes its return stroke in the direction of expansion while at the same time said moving clamp actuator drives said moving clamp to clamp said driven element at which time said driver actuator drives said moving clamp assembly and said driven element in the direction of contraction.

4. The inchworm actuator of claim 1, wherein said driven element, said driver base, and said driver assembly are arranged in a configuration which forms a rectangular cross-section.

5. The inchworm actuator of claim 1, wherein said driven element, said driver base and said driver assembly are arranged in a configuration which forms an arcuate cross-section.

6. The inchworm actuator of claim 1, wherein said driven element is driven along a straight line.

7. The inchworm actuator of claim 1, wherein said driven element is driven along a curved line.

8. The inchworm actuator of claim 1, wherein said driven element, said driver base and said driver assembly are arranged in a configuration which forms a rectangular array.

9. The inchworm actuator of claim 1, wherein said driven element, said driver base and said driver assembly are arranged in a cylindrical configuration.

10. The inchworm actuator of claim 1, wherein said driver assembly further comprises:
   a driver support located adjacent to said driver actuator,
   a reaction bar fixedly attached to the top of said driver support, and
   an incremental reversal spring which is located between said reaction bar and said driver actuator and which acts to oppose the motion of said driver actuator.

11. The inchworm actuator of claim 1, wherein said driver assembly further comprises a reversal spring attached at one end to the top of said driven element and at the bottom end to said driver base, wherein said reversal spring acts to oppose the motion of said driver actuator.

12. The inchworm actuator of claim 1, wherein said moving clamp comprises a bent lever further comprising a first arm, a second arm, and a bent-lever fulcrum, wherein said bent lever is rotatably attached to said moving clamp support via said bent-lever fulcrum and wherein said bent lever is located adjacent to said driven element in such a way that when said moving clamp actuator acts against said first arm, said bent lever rotates and said second arm impinges against said driven element.

13. The inchworm actuator of claim 2, wherein said fixed clamp comprises a bent lever further comprising a first arm and a second arm, wherein said bent lever is rotatably attached to said fixed clamp support and wherein said bent lever is located adjacent to said driven element in such a way that when said fixed clamp actuator acts against said first arm, said bent lever rotates and said second arm impinges against said driven element.

14. The inchworm actuator of claim 1, wherein said driver assembly comprises one or more of the following:
   a driver cap fixedly attached to the top of said driver actuator,
   a driver bar attached to the top of said moving clamp support,
   a driver support adjacent to said driver actuator,
   an amplifying lever,
   a fulcrum fixedly attached to a top portion of said driver support about which said amplifying lever rotates,
   a first linkage between said driver cap and a portion of said amplifying lever,
   a second linkage between said driver bar and an end of said amplifying lever, wherein said driver actuator drives said first linkage to cause said amplifying lever to rotate which causes said driver bar to act against said moving clamp support via said second linkage, thereby driving said driven element with a particular mechanical advantage, wherein the direction of motion of said driven element depends on the position at which said fulcrum is located on said amplifying lever.

15. The inchworm actuator of claim 14, wherein said first and second linkages comprise links.

16. The inchworm actuator of claim 14, wherein said first and second linkages comprise hinges of monolithic construction.

17. The inchworm actuator of claim 12, wherein said bent-lever fulcrum comprises a link.

18. The inchworm actuator of claim 12, wherein said bent-lever fulcrum comprises hinges of monolithic construction.

19. An inchworm-actuator valve comprising:
a tube,
support tabs located within said tube,
a nozzle seat located a distance above said support tabs within said tube,
an inchworm actuator further comprising:
a driven nozzle,
a driver base fixedly attached to said support tabs,
a driver assembly comprising a driver actuator, wherein said driver actuator has a length that is greater than its width or depth, wherein said driver actuator is oriented so that said driver actuator length is parallel to the direction in which said driven nozzle is driven, wherein a bottom end of said driver actuator is fixedly attached to said driver base,
a moving clamp assembly comprising a moving clamp actuator, a moving clamp, and a moving clamp support fixedly attached at its top end to the top of said driver actuator, wherein said moving clamp actuator has a length that is greater than its width or depth, wherein said moving clamp actuator is oriented so that said moving clamp actuator length is parallel to the direction in which said driven nozzle is driven, wherein the bottom of said moving clamp actuator is fixedly attached to the bottom of said moving clamp support, wherein said moving clamp is attached to the top of said moving clamp support, wherein said moving clamp actuator drives said moving clamp to clamp said driven nozzle,
a second clamp assembly, the bottom of which is fixedly attached to said driver base, wherein said second clamp assembly has a length that is greater than its widths or depths, wherein said second clamp assembly is oriented so that said length is parallel to the direction in which said driven nozzle is driven, wherein said second clamp assembly may be activated to clamp said driven nozzle, and
a wiring system for activation of said driver actuator, said moving clamp actuator, and said second clamp assembly for driving said inchworm actuator to expand or contract, wherein said expansion occurs when the following actuator stroke cycle is enacted: in a first period of time said second clamp assembly releases said driven nozzle and said moving clamp assembly engages said driven nozzle, at which time said driver actuator changes length to drive said moving clamp assembly and said driven nozzle in an expanding direction; and in a second period said moving clamp assembly releases said driven nozzle at which time said second clamp assembly engages said driven nozzle, after which time said driver actuator undergoes its return stroke in the direction of contraction, wherein said contraction occurs when the following actuator stroke cycle is enacted: in a first period of time said second clamp assembly releases said driven nozzle and said moving clamp assembly engages said driven nozzle, at which time said driver actuator changes length to drive said moving clamp assembly and said driven nozzle in a contracting direction; and in a second period said moving clamp assembly releases said driven nozzle at which time said second clamp assembly engages said driven nozzle, after which time said driver actuator undergoes its return stroke in the direction of expansion, wherein said driven nozzle can be driven into said nozzle seat to block any fluid flow through said tube.

20. The inchworm-actuator valve of claim 19, wherein said nozzle seat further comprises a nozzle spring which resists the closing of said driven nozzle into said nozzle seat.

21. The inchworm-actuator of claim 19, wherein said driven nozzle further comprises:
a flap axle fixedly attached within and across said tube in the vicinity of said nozzle seat,
a butterfly flap rotatably attached to said flap axle,
a flap driver link attached at one end to said driven nozzle and at the other end to said butterfly flap, wherein said driver actuator drives said driven nozzle to act against said butterfly flap via said flap driver link to close said butterfly link against said nozzle seat.

22. The inchworm-actuator of claim 1, wherein said driver actuator, said moving clamp actuator, or said second clamp assembly further comprise a piezoelectric driver.

23. The inchworm-actuator of claim 1, wherein said piezoelectric driver comprises a monolithic stack further comprising mesh electrodes and a piezoelectric body, wherein said mesh electrodes are imbedded in said piezoelectric body at intervals.

24. The inchworm-actuator of claim 1, wherein said piezoelectric driver comprises a transverse-poled driver further comprising longitudinal electrodes on either side of a longitudinal piezoelectric body.

25. The inchworm-actuator of claim 1, wherein said longitudinal electrodes comprise a center electrode and a perimeter electrode with said longitudinal piezoelectric body filling the intervening volume.

26. The inchworm-actuator of claim 24, wherein said piezoelectric driver further comprises longitudinal mesh electrodes spaced at intervals within said piezoelectric driver from one side of said longitudinal piezoelectric body to the other side.

27. The inchworm-actuator of claim 25, wherein said longitudinal electrodes further comprise cylindrical longitudinal mesh electrodes spaced at intervals within said piezoelectric driver from said center electrode to said perimeter electrode.

* * * * *